N. AHRBIN.
TIRE WRAPPING DEVICE.
APPLICATION FILED MAR. 6, 1915.
1,246,832.
Patented Nov. 20, 1917.
2 SHEETS—SHEET 2.
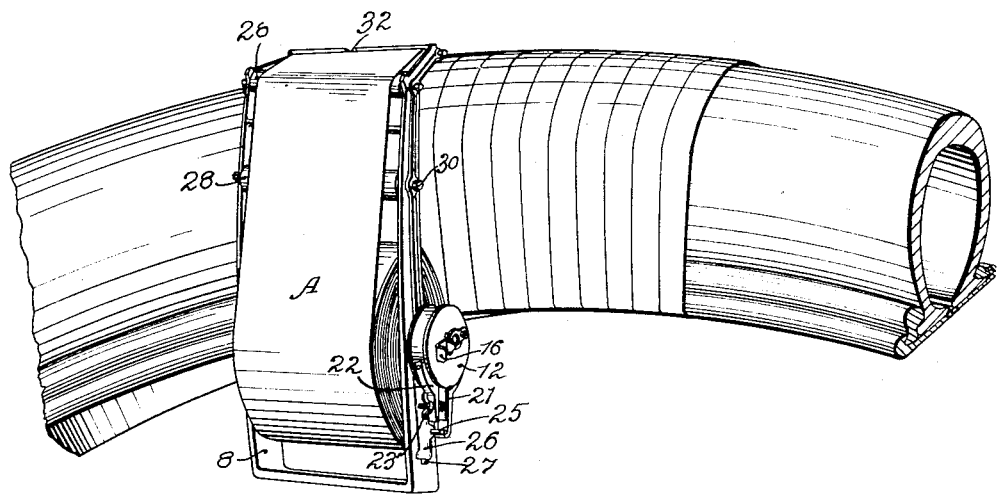
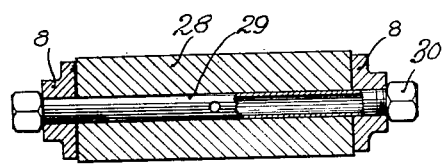
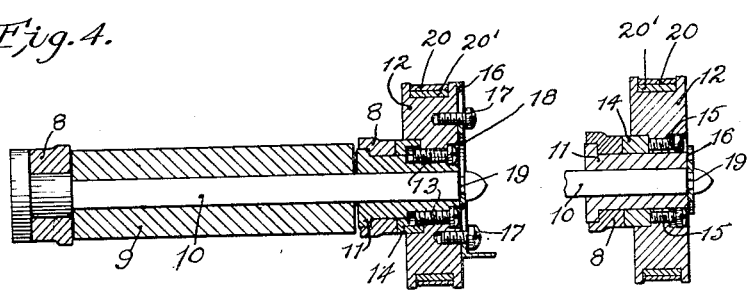

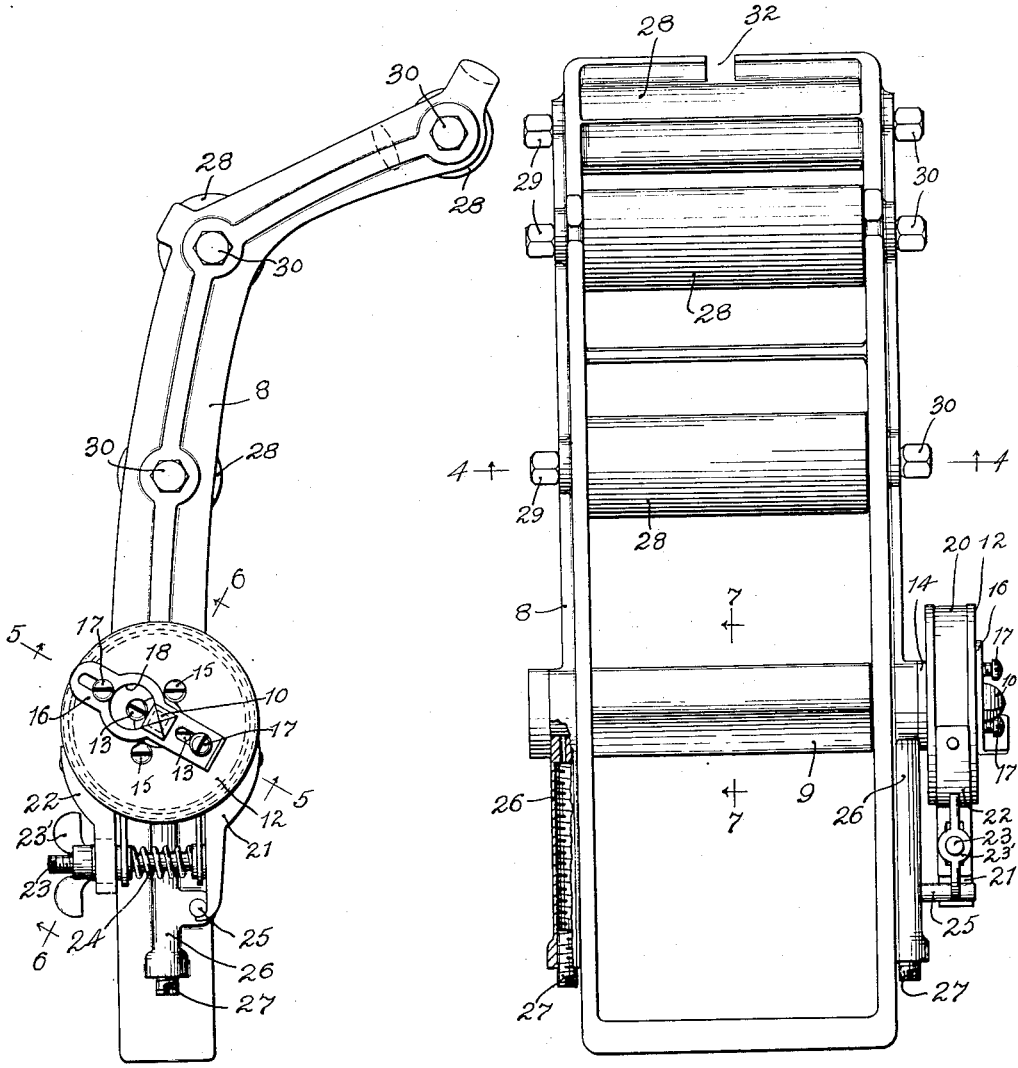

UNITED STATES PATENT OFFICE.

NELS AHRBIN, OF CHICAGO, ILLINOIS.

TIRE-WRAPPING DEVICE.

1,246,832.  Specification of Letters Patent.  Patented Nov. 20, 1917.

Application filed March 6, 1915. Serial No. 12,557.

*To all whom it may concern:*

Be it known that I, NELS AHRBIN, a subject of the King of Sweden, and a resident of the city of Chicago, county of Cook, and State of Illinois, have invented certain new and useful Improvements in Tire-Wrapping Devices, of which the following is a specification.

My invention relates to improvements in tire wrapping devices used in the wrapping of a strip of fabric around a tire in the retreading or vulcanizing operation. The wrapping of a strip of fabric around a tire in the retreading or vulcanizing thereof, is necessary in order to prevent blistering of the rubber, and further, in order to press the rubber firmly into the fabric of the tire. In order to be of any service, the strip of fabric must be wrapped around the tire very tightly, or under a high tension.

The object of my invention is the production of a device for effecting the wrapping of a tire manually and through the medium of which the required tension may be placed upon the wrapper-strip in the wrapping operation.

A further object is the production of a wrapping device, as mentioned, which will be of simple construction and efficient in operation.

Other objects will appear hereinafter.

The invention consists in the combinations and arrangements of parts hereinafter described and claimed.

The invention will be best understood by reference to the accompanying drawings forming a part of this specification, and in which, Figure 1 is a front elevation of a tire wrapping device embodying my invention, portions being broken away and shown in section to better illustrate the construction, Fig. 2 is a side elevation of the device, Fig. 3 is a perspective view illustrating the method of employment of the device, Fig. 4 is a detail section taken on substantially line 4—4 of Fig. 1, Figs. 5 and 6 are detail sections taken on substantially lines 5—5 and 6—6 respectively of Fig. 2, and Fig. 7 is a detail section taken on line 7—7 of Fig. 1.

The preferred form of construction, as illustrated in the drawings, comprises a supporting frame 8 of elongated substantially rectangular form. In the lower end portion of said frame is arranged a spool or holder 9 upon which the coil of wrapper-strip A, which it is desired to apply to the tire to be wrapped, is adapted to be mounted. The spool 9 is mounted upon a shaft 10 rotatably mounted in the frame 8, said shaft, except for a short distance at one end, being square in cross section, and the opening through said spool being of corresponding form, as clearly shown in Fig. 7, in order to lock the parts together. The periphery of said spool also is of substantially square or pointed formation, in order to prevent slipping of the wrapper coil thereon. The squared outer end of shaft 10 is mounted in a bearing member 11, said bearing member having a square opening therethrough so as to lock the same upon said shaft against relative rotary movement. The periphery of the member 11 is cylindrical for rotary movement in the corresponding side of frame 8.

Mounted upon the outer end of the member 11 is a drum 12 which is locked to the former by means of screws 13 which engage in threaded openings formed partly in said drum and partly in said bearing member, as will be readily understood, this construction being shown in Figs. 2 and 5.

In order to take up any lost longitudinal movement of the bearing member 11 and the drum 12, a washer or sleeve 14 is arranged upon said bearing member interposed between said drum and the adjacent side of frame 8. Threaded in said drum are two screws 15 which engage at their inner ends against the adjacent side of the member 14, as clearly shown in Fig. 6. With this arrangement, it will be seen that any lost motion, as may result from wear, may be readily and easily taken up by simply tightening said screws 15.

The shaft 10 is locked in position by means of a plate 16 shiftably secured upon the outer side of drum 12 by means of screws 17 which engage elongated slots provided in said plate. The central portion of said plate is provided with a key-hole slot 18 which permits of said plate engaging with an annular slot 19 formed in the adjacent end of the shaft, as clearly shown in Figs. 5 and 6. The plate 16 is, of course, locked in operative position by tightening of the screws 17. By this arrangement then, it will be seen that, in the removal of the shaft 10, it is only necessary to loosen the screws 17 to unlock the plate 16, whereupon the latter may be shifted to bring the larger end of the slot 18 into registration with the shaft, in which event, the latter will be unlocked so as to permit of longitudinal shifting, as desired.

Embracing the drum 12 is a friction band 20 formed of metal which is lined with a lining 20' of leather or other suitable friction material, the periphery of said drum being channeled for the reception of the parts 20 and 20'. Secured to the ends of the band 20 are end pieces 21 and 22 with which coöperates a bolt 23 which is secured at one end to the member 21. The opposite end of said screw passes loosely through the member 22 and is provided with a thumb nut 23' whereby the end pieces 21 and 22 may be drawn together in order to increase the friction or braking action of the friction band upon the drum 12 and hence the shaft with which said drum is connected. Between the end pieces 21 and 22 is interposed a helical compression spring 24 for pressing the same apart when the screw 23' is released. Projecting laterally from the adjacent side of frame 8 is a stud or pin 25 adapted for engagement with the outer end of member 21 in order to lock the same and hence the friction band against relative rotation.

With the construction set forth then, it will be seen that, a brake is provided coöperating with the shaft 10 and whereby in the uncoiling of the wrapper-strip A, the desired tension may be placed thereon.

Formed in the sides of the frame 8 at the lower end thereof are lubrication cups 26 which communicate at their upper ends with the bearings of shaft 10 and member 11, as clearly shown in Fig. 1. In the lower ends of cups 26 are threaded screws 27 whereby the lubricant may be forced from said cups in the lubricating operation.

Also mounted in the frame 8, above the shaft 10, are rollers 28 each of which is rotatably mounted upon a shaft 29 the ends of which are mounted in bearings provided in the opposite sides of said frame. Said shafts 29 are tubular in form in order to constitute chambers therein for the reception of a lubricant, and at one end of each of said shafts is provided a removable threaded cap 30 whereby access may be gained to said chambers for supplying the lubricant thereto. Formed in each of said shafts intermediate the ends thereof is a discharge opening 31 through which the lubricant may flow, as will be readily understood.

In using the device, after the mounting of the coil of wrapper-strip upon the shaft 10, the outer end thereof is fastened to the tire and the wrapper-strip wound about the tire by passing the device from hand to hand around the tire in the manner shown in Fig. 3. The upper end of the device is of angular formation, or the inner side thereof is of concave formation in order to conform with the contour of the tire. The rollers 28, in the wrapping operation, perform the double function of guides for the wrapper-strip, and of anti-friction devices for engagement with the outer side of the tire. The upper bar of the frame 8 is provided with a slot 32 to permit of the passage of the wrapper-strip 32 to engagement with the adjacent roller 28, the transverse bar at the opposite end of said frame constituting a handle in the wrapping operation.

While I have illustrated and described the preferred form of construction for carrying my invention into effect, this is capable of variation and modification without departing from the spirit of the invention. I, therefore, do not wish to be limited to the precise details of construction set forth but desire to avail myself of such variations and modifications as come within the scope of the appended claims.

Having described my invention what I claim as new and desire to secure by Letters Patent is:

1. A tire wrapping device comprising a frame consisting of parallel side members and transverse end members, one of said end members being slotted to permit of passage of a wrapping element, and said side members being curved at one end to conform to the general contour of the tire, a tape reel arranged adjacent the opposite end of the frame from said slotted end member, the distance from the curved end of the side members to said reel being substantially equal to the depth of a tire, tape guiding rollers arranged between said reel and said slotted end member and a brake for said reel, substantially as described.

2. A tire wrapping device comprising a frame consisting of parallel side members and transverse end members, one of said end members being slotted to permit of passage of a wrapping element, and said side members being curved at one end to conform to the general contour of the tire, a tape reel arranged adjacent the opposite end of the frame from said slotted end member, the distance from the curved end of the side members to said reel being substantially equal to the depth of a tire, tape guiding rollers arranged between said reel and said slotted end member and an adjustable brake for said reel, substantially as described.

3. A tire wrapping device comprising a frame consisting of parallel side members and transverse end members, said side members being curved at one end to conform to the general contour of a tire, a tape reel arranged adjacent the opposite end from said curved portions, the distance from the curved end of the side members to said reel being substantially equal to the depth of a tire, the adjacent end member comprising an operating handle, tape guiding rollers on said frame, brake mechanism for said reel, and means adjacent said handle for controlling said brake, substantially as described.

4. A tire wrapping device comprising a frame consisting of parallel side members and transverse end members, said side members being curved at one end to conform to the general contour of a tire, a tape reel arranged adjacent the opposite end from said curved portions, the distance from the curved end of the side members to said reel being substantially equal to the depth of a tire, the adjacent end member comprising an operating handle, tape guiding rollers on said frame, brake mechanism for said reel, said mechanism comprising a drum, a friction band embracing said drum, and means adjacent said handle for adjusting said band.

5. A tire wrapping device comprising a frame consisting of parallel side members and transverse end members, said side members being curved at one end to conform to the general contour of a tire, a tape reel arranged adjacent the opposite end from said curved portions, the distance from the curved end of the side members to said reel being substantially equal to the depth of a tire, the adjacent end member comprising an operating handle, tape guiding rollers on said frame, brake mechanism for said reel, said mechanism comprising a drum, a friction band embracing said drum, end pieces on the ends of said band, a bolt connecting said end piece and a nut thread on said bolt for drawing said end pieces together to adjust the tension of said band, said bolt and nut being arranged adjacent said handle, substantially as described.

In testimony whereof I have signed my name to this specification in the presence of two subscribing witnesses.

NELS AHRBIN.

Witnesses:
 JOSHUA R. H. POTTS,
 HELEN F. LILLIS.